J. F. ALLARD.
TYPE WRITING MACHINE.
APPLICATION FILED JUNE 7, 1913. RENEWED JAN. 21, 1915.

1,194,587.

Patented Aug. 15, 1916.
7 SHEETS—SHEET 5.

WITNESSES:
F. E. Alexander
Julius Duckstine

INVENTOR:
J. Frank Allard
BY
D. B. Stickney
ATTORNEY.

UNITED STATES PATENT OFFICE.

J FRANK ALLARD, OF NEW YORK, N. Y., ASSIGNOR TO UNDERWOOD TYPEWRITER COMPANY, OF NEW YORK, N. Y., A CORPORATION OF DELAWARE.

TYPE-WRITING MACHINE.

1,194,587.  Specification of Letters Patent.  Patented Aug. 15, 1916.

Application filed June 7, 1913, Serial No. 772,222. Renewed January 21, 1915. Serial No. 3,636.

*To all whom it may concern:*

Be it known that I, J FRANK ALLARD, a citizen of the United States, residing in Brooklyn borough, in the county of Kings, city and State of New York, have invented certain new and useful Improvements in Type-Writing Machines, of which the following is a specification.

This invention relates to typewriting machines especially adapted for writing two different languages, in one of which the lines of writing extend from the top to the bottom of a page, and in the other of which the lines extend from left to right across the page, as in writing English.

A feature of the invention is the provision of a machine in which letter-feed rotation is imparted to the platen for writing a language, such as Korean, Chinese, Japanese, etc., in which the lines are to be placed vertically on the page, in combination with means to impart a horizontal letter-feeding movement to the platen when used for writing the English or other language in which the lines are written across the page.

Case shifting mechanism is provided, and the type keys have upper and lower case types, the upper case types comprising the alphabet of one language, as for instance, English, and the lower case types comprising the characters of the other language, for instance, Korean.

For the purpose of illustration, the machine shown in the drawings is arranged for writing the Korean and the English languages, and is a modification of the well known Underwood typewriting machine. The Korean language comprises consonants and vowels which are grouped together in various combinations when writing the language, each vowel being placed above, below, or at the right-hand side of a consonant with which it is grouped. Thus in each letter-space position there are usually combined a consonant and a vowel, the vowel always being placed below, or at the right-hand side of the consonant in the same letter-space. To economize in the number of type bars and keys, the letter-feed movement of the work-sheet is made independent of the type action, and one type key is provided for each letter. Thus any desired consonant and vowel may be written in a letter-space by operating the corresponding keys, and then a letter-feed movement of the work-sheet is effected by operating a single space key. The platen is rotated by a motor in the form of a spring barrel connected through a train of gears to the platen, the movement being controlled by an escapement wheel with which coöperate escapement dogs operated by said space key.

The ribbon mechanism comprises a vibrator actuated by a universal bar in the path of the type bars. For spacing between words or groups of characters, a double space key is provided which, through an arm having a double cam face, operates said escapement mechanism and permits a letter-space rotation of the platen when the key is depressed, and a second letter-space movement when the key returns.

In order to line-space when the Korean language is being written, a key is provided which actuates mechanism similar to the back-space mechanism employed on the Underwood typewriting machine to move the carriage from left to right. After a vertical line of writing has been completed, the work-sheet is returned by means of a hand lever which operates through the above mentioned train of gears to rotate the platen backward.

For writing the English language the platen is shifted to upper case position by a shift key, which also sets the various mechanisms for writing English. A horizontal letter-feed movement of the carriage is effected by a second spring motor controlled by a second escapement mechanism which is brought into operative relation to the universal bar by depressing the shift key. That is, when the platen is lifted by depressing the shift key, an interponent on the rock frame, which carries the escapement dogs, is permitted to move upward into the path of the universal bar frame, so that each type bar, through the universal bar, operates the escapement. The shift key when depressed also operates through suitable connections to open a clutch in the train of gears between the platen and the first-named motor. Also the shift key when depressed holds the escapement dogs for the first motor in position to lock the motor, and also to prevent said escapement being operated by the single space key. The latter is utilized in writing English for spacing between words in the usual manner, being brought into operative relation to the carriage escapement mechanism through an arm which, by depression of the shift key, is projected into position to rock the escapement frame, said arm being rocked to operate the escapement when the space key is depressed.

The present invention involves certain features disclosed in my copending applications, Serial Numbers 741,609 and 760,617. Other features and advantages will hereinafter appear.

In the accompanying drawings.

The machine herein shown is a modification of the commercial Underwood typewriting machine, but it is to be understood that the principles of the invention may be embodied in various other types and forms of machines, and that the invention comprehends all such constructions and modifications as come within the spirit and scope of the appended claims.

The type keys 1 on levers 2 operate through bell crank levers 3 having slot and pin connections 4 with type bars 5 to swing the latter about the fulcrum rod 6 upward to printing position in front of the platen 7. The type bars 5 have upper case types 8 which may comprise the English alphabet, or characters of any other language in which the writing extends in horizontal lines across the page, and lower case types 9 which comprise the characters in the Korean or other language adapted to be written in lines extending from the top to the bottom of the page. The platen 7 is journaled in a frame 10, and is supported on rock arms or hooks 11 on a shaft 12 on the carriage frame 13, the latter being supported and guided during its horizontal movement on front and rear carriage rails 14 and 15.

A roller 16 on the platen frame runs on a guide rail 17 on a shift frame comprising bell cranks 18 secured to a rock shaft 19 journaled in the machine frame. A shift key 20 on a shift key lever 21 fulcrumed on a rod 22 has an upwardly extending arm 23 bearing against the bell crank 18 so that when the shift key is depressed, said shift frame will be swung upward to lift the platen to upper case position for writing English.

The ribbon mechanism comprises a ribbon vibrator 24 connected to a lever 25 pivoted at 26 to a bracket on the rail 17, and having a vertical arm carrying a pin 27 working in a vertical slot 28 formed in a bracket 29 carried by a frame 30 of a universal bar 31. The rear end of the universal bar frame 30' is supported by a rock frame 30ª fulcrumed on the machine frame.

Each type bar 5 is formed with a heel 32 which, as the type bar swings up to printing position, engages the universal bar 31 and moves it rearwardly, thereby rocking the lever 25 on its fulcrum 26 and moving the vibrator 24 and ribbon upwardly over the printing point. The universal bar is returned by a spring 33. The slot and pin connection 28, 27, permits the vibrator and its lever to move upward with the platen, and maintains an operative relation between the universal bar and vibrator for both upper and lower case positions of the platen.

The operation of the machine in writing Korean is substantially different from its operation in writing English. This difference is due primarily to the fact that in Korean the lines of writing extend up and down on the page, and mechanism is therefore provided for imparting a step-by-step rotation to the platen to letter-feed the worksheet in a vertical direction, such mechanism being separate from and operable independently of the spring barrel and escapement mechanism controlling the letter-feed movement of the carriage in a horizontal direction when writing English. Also in writing Korean, the letter-spacing is not controlled by the type keys, but by a space key which is also utilized for word spacing in writing English. Other differences in the mode of operation for writing the two languages are involved. The various adjustments by which the machine is selectively adapted for writing either Korean or English are all controlled by the case shift key 20.

The mechanism as adapted and used for writing English will first be described. The carriage is given a letter-feed movement in the direction of its axis by means of a motor comprising a spring barrel 34 connected by a band 35 to the carriage. This letter-feed movement is controlled by escapement mechanism which is operative only when the carriage is in upper case position for writing English, being silenced when the platen is in lower case position for writing Korean. This escapement mechanism comprises a rocker frame 36 pivoted to rock about a horizontal axis parallel with the platen axis. The rocker frame carries escapement dogs 37 and 38 respectively fixed to and pivoted thereon.

Figures 5, 6, 7, 8, 9:
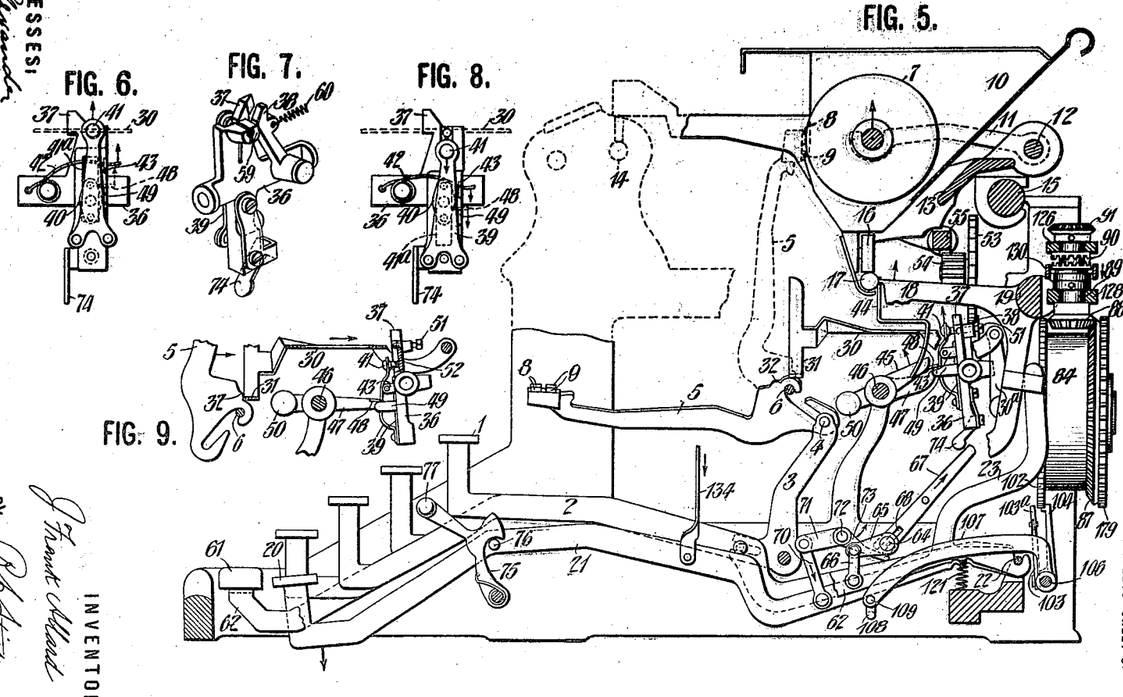
Fig. 5 is a view similar to Fig. 2, but with certain parts added and others omitted, the shift key also being depressed, adapting the machine for writing the English language.
Fig. 6 is a front view of the letter-feeding or escapement dog rocker, showing the positions of the parts when the machine is being used for writing English.
Fig. 7 is a perspective rear view of the parts shown in Fig. 6.
Fig. 8 is a front view similar to Fig. 6, but showing the normal position of parts for writing Korean.
Fig. 9 is a sectional side elevation to illustrate the movement of the universal bar when the letter-feeding mechanism is silenced, for writing Korean.

On the front face of the rocker 36 is a vertically slidable interponent 39 held in position by a bracket 40 extending through a slot 41ᵃ in the slide 39. The upper end of the slide 39 carries a knob 41 which, when the slide is in its elevated position shown in Figs. 5 and 6, is in the path of the universal bar frame 30 so that the latter can operate the escapement. The slide 39 is moved upward by a spring 42 which is connected to a lug 43 on the slide, and is moved downward to inoperative position, shown in Figs. 8 and 9, by the following means: Secured to the shift rail 17 is a depending arm 44 having its lower end bifurcated to straddle a rock arm 45 fixed to a rock shaft 46, to which is also secured an arm 47 projecting rearwardly, and having a lateral offset 48 extending over a finger 49 projecting forward from the interponent slide 39. When the carriage is shifted to upper case position, counterweights 50 on the rock arms 45 and 47 rock the shaft 46 to lift the arm 47 and permit the interponent slide to be moved upward by its spring. When the carriage is lowered, the arm 44 rocks the shaft 46 and through the arm 47 moves the interponent slide 39 downward to an inoperative position to silence the escapement mechanism. As shown in Fig. 9, the escapement mechanism is out of the range of the universal bar frame 30.

The interponent 39 may be adjusted by a set screw 51 which engages the inclined surface 52 of knob 41. The escapement dogs 37 and 38 coöperate with an escapement wheel 53 having a pawl and ratchet connection 172 (Fig. 10) with a pinion 54 in mesh with a rack 55 on the carriage. The rack 55 may be carried by a frame 56 (Fig. 3) pivoted at 57 and adapted to be lifted by a release key 58.

Assuming the platen to be in upper case position for writing English, when a type key is depressed and the corresponding type bar swung up to printing position, the universal bar frame 30 rocks the frame 36 and carries the pivoted dog 38 rearwardly out of engagement with the escapement wheel and the fixed dog 37 into position to engage a tooth of said wheel. The pivoted dog, as it leaves the wheel, is rocked by its spring 60 into position to be returned in front of the next tooth of the wheel. As the rocker frame 36 again swings forward, the dog 37 is released and the escapement wheel, under the influence of the carriage spring, is rotated the distance of one tooth, carrying with it the pawl 38 which is thus returned and brought to rest against a stop 59 on the rocker frame. The carriage is thus given a step-by-step letter-feeding movement in the direction of the platen axis as the type keys are operated.

Figures 11, 12:
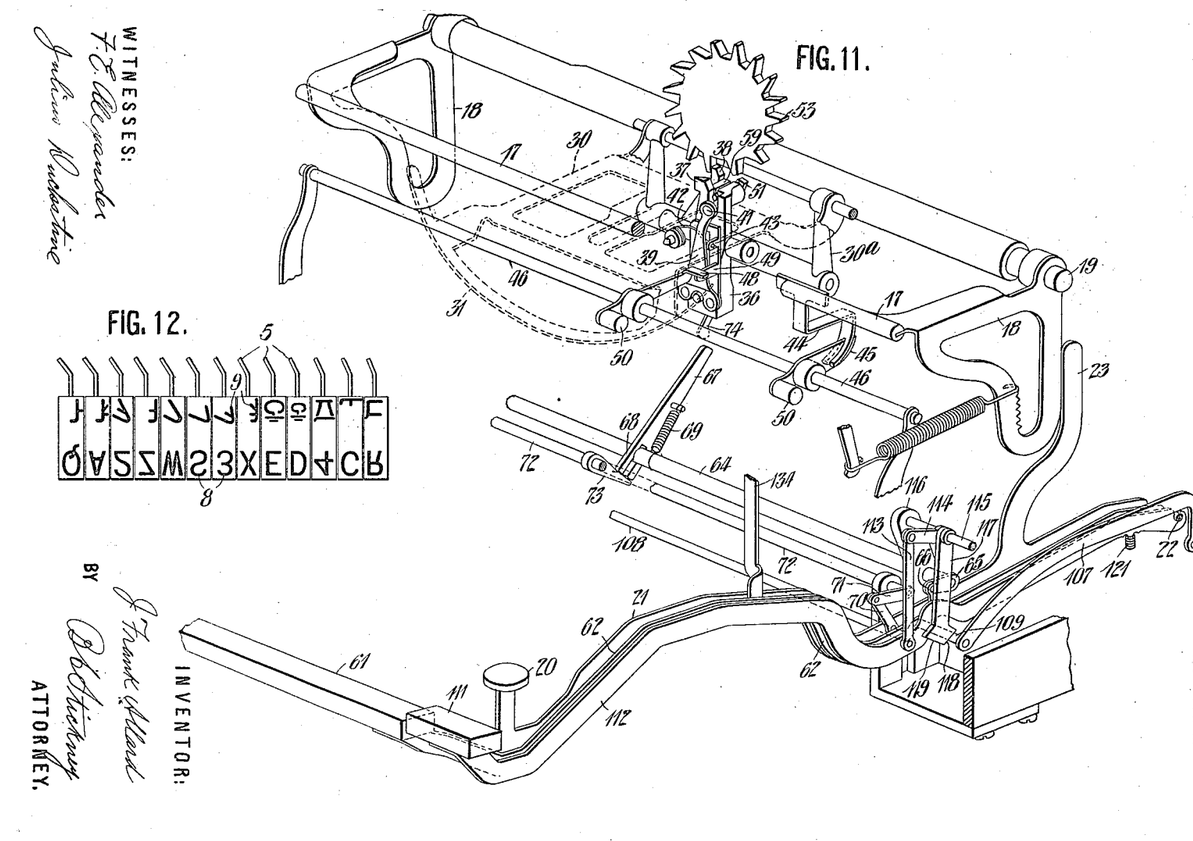
Fig. 11 is a perspective view illustrating the single-space, double-space, and shift keys, and mechanism controlled thereby.
Fig. 12 is a diagrammatic plan view of some of the types, substantially as they appear in the type basket.

For spacing between words, or independently of the type keys, a space bar or key 61 is provided, which may also be utilized for spacing when Korean is being written, as will appear hereinafter. The space bar 61 is connected to arms 62 and 63 extending rearwardly and fulcrumed on the rod 22. A rock shaft 64 (see Figs. 5 and 11) is connected through a rock arm 65 and link 66 to the arm 62 for rocking the shaft 64 when the space key is depressed, and thereby rocking an arm 67 having a forked end 68 slidably mounted on a squared or flattened portion of the shaft 64. When the platen is in lower case position, the arm 67 is held by a spring 69 in an inoperative position, but when the shift key 20 is depressed to shift the platen to upper case position, the shift key lever 21 operates through a link 70 and rock arm 71 to rock a shaft 72, and with it a rock arm 73 on the shaft 72, thereby projecting the arm 67, which is in the path of the arm 73, into position to coöperate with the escapement mechanism. With the arm 67 thus projected, as shown in Fig. 5, when the space bar 61 is depressed to rock the shaft 64 and with it the arm 67, the latter strikes a tail piece 74 on the escapement rocker 36 and operates the latter to permit a letter-space movement of the carriage. The shift key 20 is adapted to be held depressed by a latch 75 which engages a pin 76 on the shift key lever, and which may be released by a handle 77.

Figure 1:
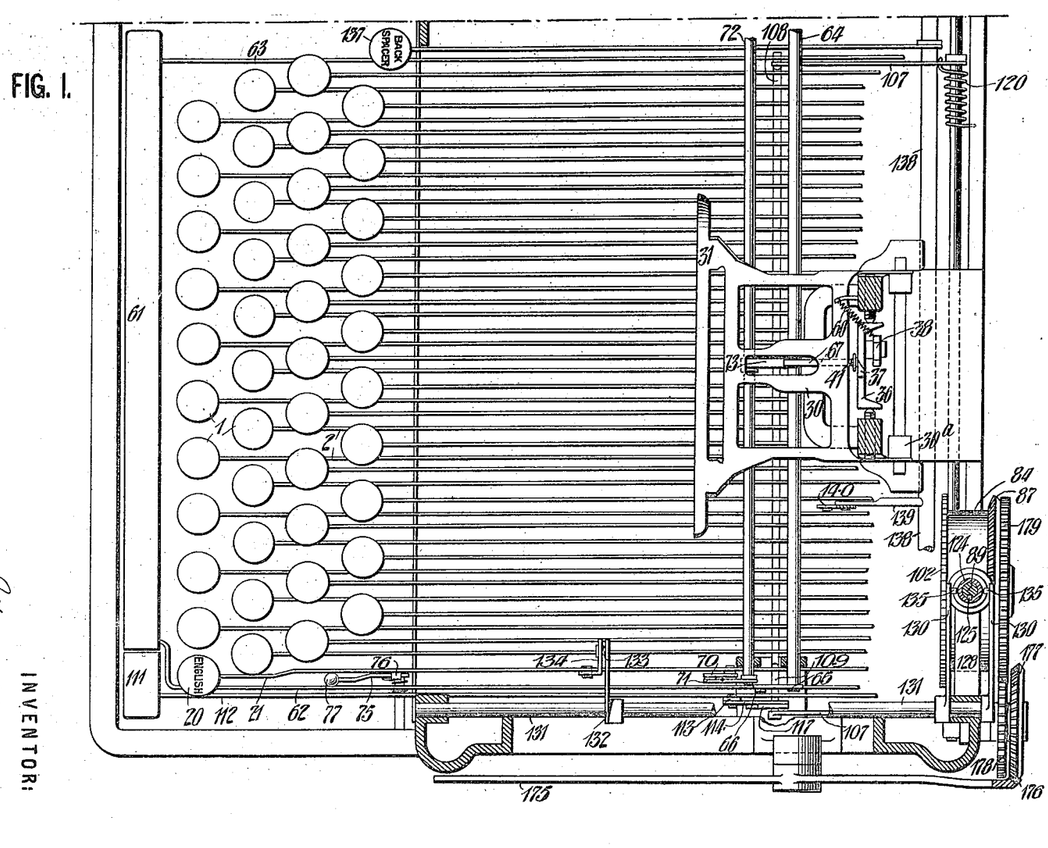
Figure 1 is a sectional plan view of the machine, parts being broken away.
Figures 2, 3, 4:
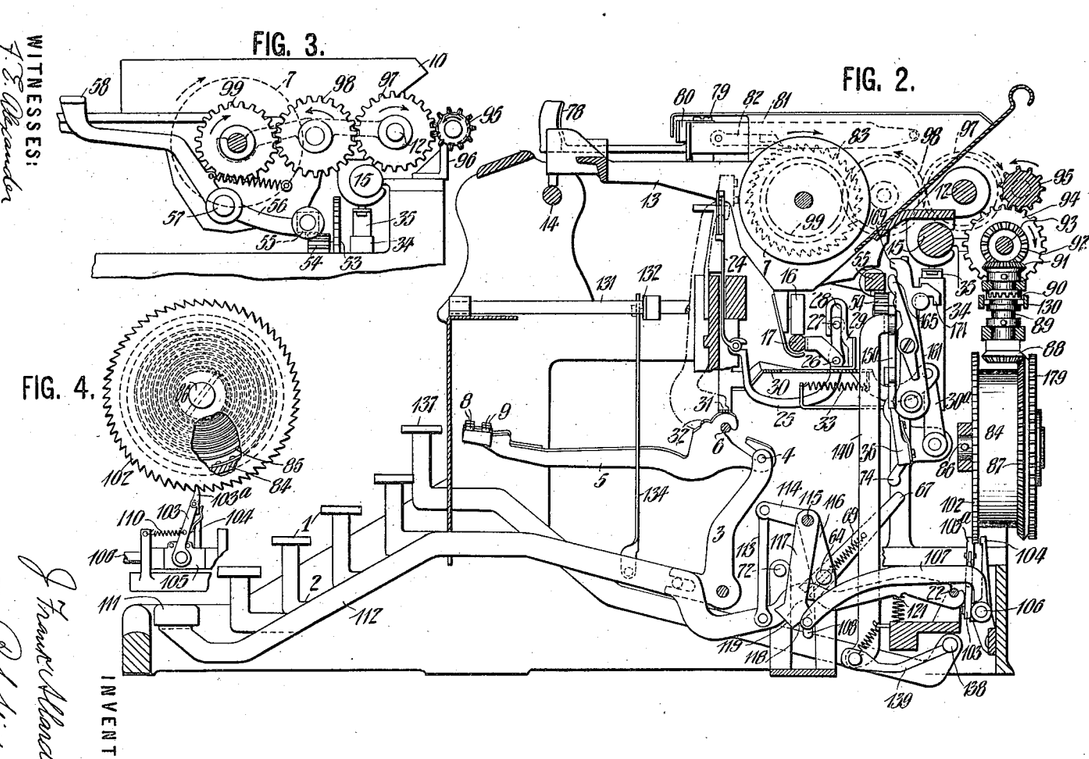
Fig. 2 is a sectional side elevation of the machine, viewed from the right-hand side, the mechanism being adjusted for writing Korean.
Fig. 3 is a detail view showing a train of gears for imparting a rotary letter-feed movement to the platen.
Fig. 4 is a detail showing the spring motor for operating the gearing of Fig. 3, also the escapement mechanism controlling said motor.

A rotary line-space movement may be imparted to the platen by means of line-space mechanism, shown in Fig. 2, comprising a line-space lever 78 pivoted at 79 and having an arm 80 to engage and move rearward a slide 81 to which is pivoted a dog 82 coöperating with a line-space ratchet wheel 83 secured to the platen axle. This line-space mechanism may be in the form usually employed in the Underwood typewriting machine.

In writing Korean, or other language in which the lines extend from the top to the bottom of the page, it is desirable that a letter-feed movement of the work-sheet should be effected by rotating the platen about its axis. This permits the characters to be placed in an upright position on the type bars, so that they will appear in a normal upright position when written. To effect this angular or rotary letter-feed movement of the platen, a motor is provided which may be in the form of a spring barrel 84 containing a coil spring 85 secured at one end to the barrel and at its opposite end to a shaft 86 on which the barrel is journaled. A beveled gear wheel 87 on the barrel 84 meshes with a beveled pinion 88 connected through a shaft 89 and clutch 90 with a miter gear 91 in mesh with a miter pinion 92 fixed to a shaft 93 parallel with the platen and journaled at its ends on the machine frame. Secured to the shaft 93 is a gear wheel 94 which runs in mesh with a barrel gear pinion 95 journaled at its ends in brackets 96 on the machine frame.

The barrel pinion 95 has a slidable and driving engagement with gears 97, which, through idler gears 98 and gears 99 fixed to the platen axle rotate the platen. The gears 97 may be mounted on the shaft 12 supported in the arms 11 connecting the shaft 12 and the platen axle and supporting the idler gears 98. As the gears 97 are mounted on the shaft 12, which forms the fulcrum about which the platen is shifted to upper and lower case positions, the gears will not be thrown out of mesh by the shifting of the platen.

The rotary movement of the platen is controlled by means of escapement mechanism comprising an escapement wheel 102 fixed to the barrel 84 and with which coöperate escapement dogs 103 and 104, pivoted and fixed respectively to a rocker 105 secured to a rock shaft 106. Fixed to the rock shaft 106 is a frame comprising forwardly extending arms 107 to which is connected a bar 108 extending across the machine beneath the key levers. The bar 108 is out of range of the type key levers, so that it is unaffected by the operation of the type keys. The ends of said bar are offset, however, in an upward direction, the right-hand end 109, as viewed from the front of the machine, being in position to be operated by either the space key lever 62 or the shift key lever 21, for purposes which will hereinafter appear. If the space key 61 is depressed, the rod 108 is thereby carried downward and rocks the shaft 106. The dogs 103 and 104 are thus moved forward, the dog 104 engaging and holding the escapement wheel 102, while the dog 103 is released, and by its spring 110 is swung into position to engage the next tooth of the escapement wheel as the rocker 105 returns, and permitting the escapement wheel to rotate a distance of one tooth, as the dog 104 releases the wheel during said return movement.

The rotation of the escapement wheel 102 is transmitted through the train of gearing already described, to rotate the platen in the forward direction about its axis a letter-space distance. Thus, in writing Korean, a letter-space rotary movement of the platen is effected each time the space key 61 is operated, but the actuation of the type keys does not produce any movement of the platen, either rotary or longitudinal. This arrangement permits two characters to be written, for example, any consonant and any vowel it is desired to group with the consonant, while the carriage remains stationary. The platen may then be rotated for the next letter position by operating the space key 61.

In order to permit spacing between groups of characters by a single operation, a space key is provided which, when operated effects two letter-space movements of the platen. This space key 111, which may be termed a double-space key or bar in contrast to the single-space key 61, is on a lever 112 connected through a link 113 to a rock bar 114 on a rock shaft 115 journaled in a stationary bracket 116 and the machine frame.

Figure 10:
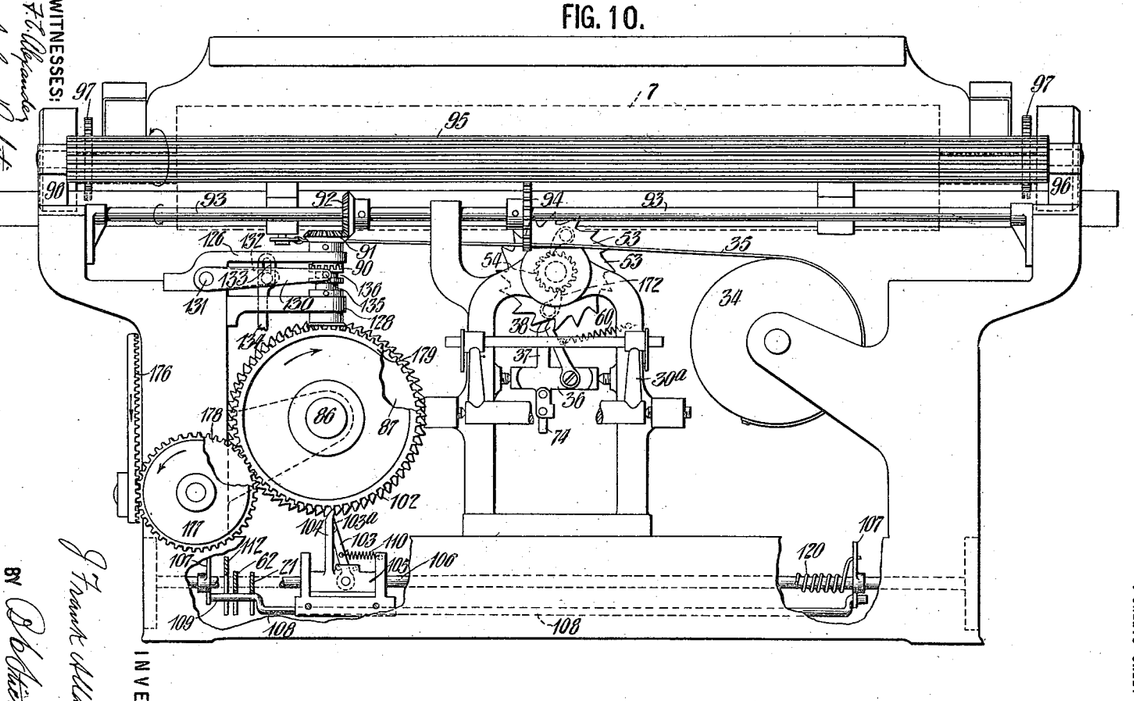
Fig. 10 is a rear elevation view of the machine certain parts being omitted.

Fixed to the rock shaft 115 is a depending arm 117 having at its lower end inclined or cam faces 118 and 119, adapted to depress the bar 108 and thereby operate the escapement. Thus, when the double-space key 111 is depressed, the arm 117 is swung rearwardly, and the cam face 118 depresses the bar 108 to rock the escapement dogs 103 and 104. As the arm 117 passes beyond the rod 108, the escapement dogs are permitted to return, thereby completing a letter-feed movement of the platen. This return movement of the escapement is effected by a spring 120 (Fig. 10). When the double-space key 111 is released and the lever 112 thrown upward by its spring 121, the arm 117 is swung forward to its initial position, and during such forward movement, the cam face 119 again depresses the rod 108 and produces a second operation of the escapement, so that the platen is rotated a second letter-space distance, for spacing groups of characters, or for spacing between words.

Figure 17:
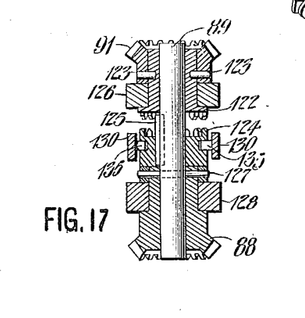
Fig. 17 is a sectional view of the clutch mechanism.

The clutch 90, shown in detail in Fig. 17, provides for disconnecting the motor 84 from the train of gearing which rotates the platen, thereby permitting the line-space rotation of the platen when writing English without interfering with said motor, and also permits the platen to be rotated in either direction for inserting or removing work-sheets, making corrections, etc., when the machine is in use for writing either language.

As shown in Fig. 17, the clutch comprises an upper member 122 loose on the shaft 89 and fixed to the pinion 91 by pins 123. The lower clutch member 124 is splined on the shaft by means of a spline or key 125, permitting the member 124 to be moved longitudinally of the shaft into and out of engagement with the upper clutch member, but preventing independent rotation of the shaft and the lower clutch member. The upper clutch member 122 is journaled in a bracket arm 126. The gear 88 is connected to the shaft by a key 127 and is journaled in a bracket arm 128. When the clutch member 124 is in its lowered position, the gears 88 and 91 may rotate independently of each other, and when the clutch members are brought together, there is a positive driving connection between said gears.

The means for operating the clutch will be understood by reference to Figs. 1, 2, 10 and 15. The clutch member 124 is operated by rock arms 130 on a rock shaft 131 to which is also fixed an arm 132 having a slot and pin connection 133 with a vertical link 134, the lower end of which is pivoted to the shift key lever 21. The arms 130 are provided with bearing lugs 135 which project into an annular recess 136 in the clutch member. When the shift key 20 is depressed, the clutch member 124, through the connections just described, is moved downward, so that the driving connection between the motor 84 and the platen is broken, permitting the platen to be rotated without affecting said motor. When the shift key is returned to normal position, the clutch member 124 is carried upward into engagement with the member 122, thereby establishing a driving train from the motor 84 to the platen.

Figure 16:
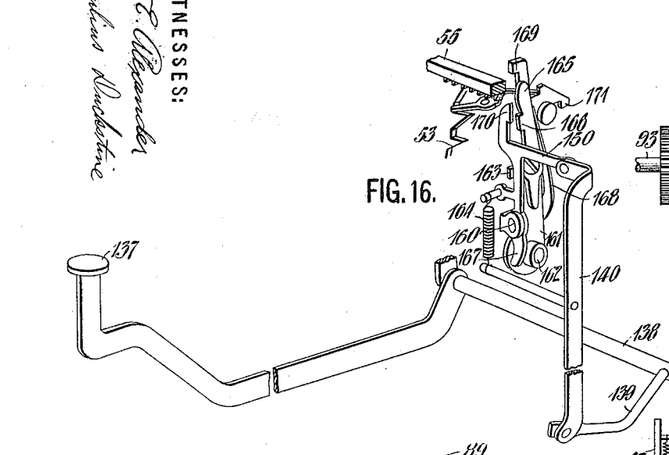
Fig. 16 is a perspective view of the back-space mechanism for line-spacing when Korean is being written.

In writing Korean, as the lines extend up and down on the work-sheet, and the order of the lines is from right to left across the sheet, the line-spacing is effected by a longitudinal movement of the carriage and platen from left to right. The mechanism for thus line-spacing the work-sheet may be substantially the same as the back-spacing mechanism of the commercial Underwood typewriting machine. This mechanism, as shown in detail in Fig. 16, comprises a back-space or line-space key 137 connected to a rock shaft 138 having a rock arm 139 connected through a link 140 to a pawl 150 pivoted at 160 to a rock frame 161 having a pivot pin 162. The pawl 150 normally rests against a stop 163 on the frame 161, being held in such position by a spring 164. The movement of the pawl in the reverse direction is normally limited or prevented by a dog 165 pivoted to the frame 161 and having a tooth 166, which lies in the path of the pawl 150. The dog 165 is held in such position by a spring 168.

When the space key 137 is depressed, the frame 161 is swung forward, and a hook 169 thereon extends over the rack bar 55 to prevent the latter from being lifted from the pinion 54. During this forward movement of the frame 161, the dog 165 is brought against the rack bar and thereby released from the pawl 150. The forward movement of the pawl 150 with the frame 161 brings a tooth 170 on the pawl into contact with the tooth of the rack bar 55. The forward movement of the frame 161 being limited by a stop 171, the continued downward movement of the space key 137 operates to swing the pawl 150 on its pivot and thereby move the rack bar 55, and with it the carriage, a letter-space distance to the right. The movement of the pawl is limited by a tail 167 thereon striking the frame 161. The pawl and ratchet connection 172 (Fig. 10) between the escapement pinion 54 and the escapement wheel 53 permits this movement of the rack bar without affecting the escapement mechanism.

When the shift key 20 is held depressed, the shaft 108 is held down thereby, as before noted, and the escapement pawls 103, 104 are held in their forward position, as shown in Fig. 5, thereby locking the motor 84 and also preventing operation of the escapement pawls or dogs 103, 104 by the space bar 61.

Figures 13, 14:
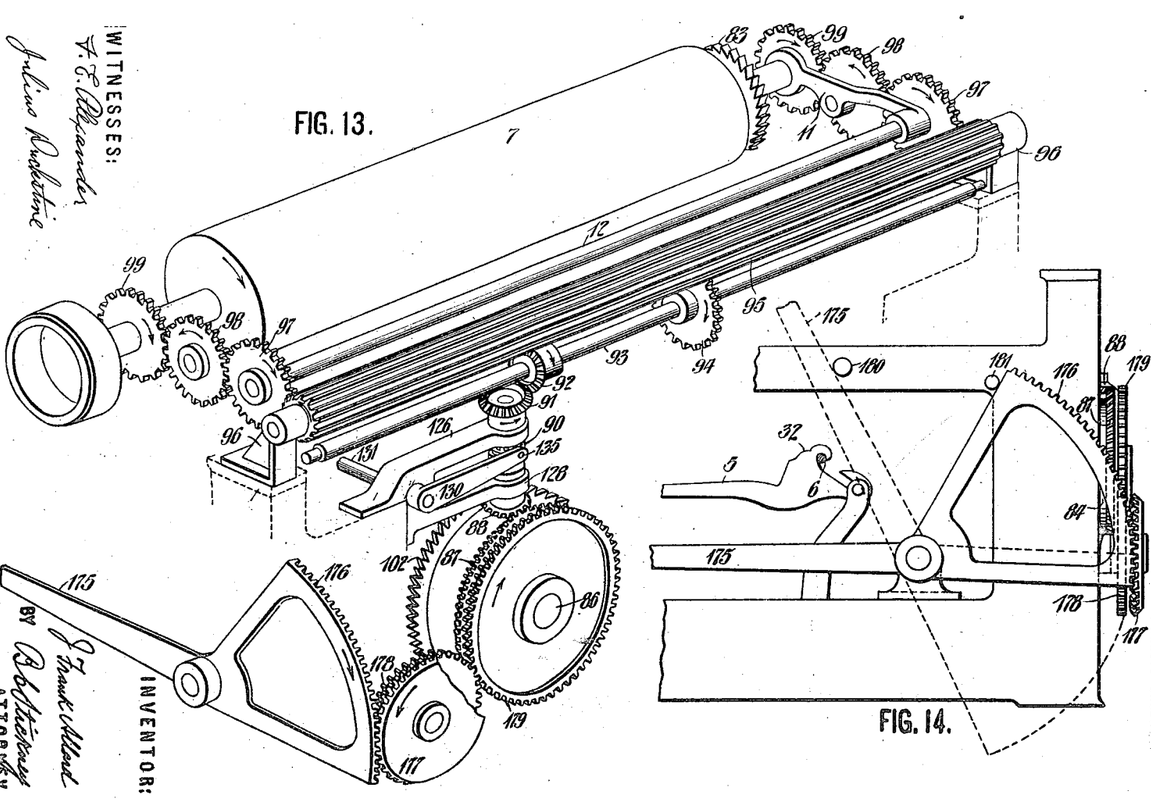
Fig. 13 is a perspective view from the rear of the platen and the gearing for imparting thereto a rotary letter-feed movement, and the means for returning the platen after a vertical line has been written on the worksheet.
Fig. 14 is an end elevation view of parts shown in Fig. 13.
Figure 15:
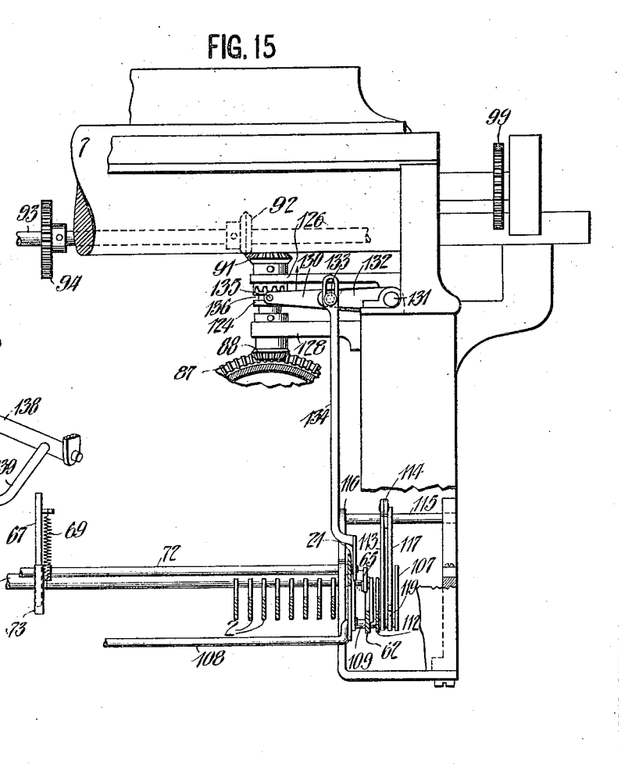
Fig. 15 is a fragmentary front elevation view, showing the clutch-shifting means and other details of the invention.

When a vertical line of writing has been completed, and either before or after the back-space key 137 has been operated to line-space for the next vertical line, the platen is rotated backward prior to commencing the new line by means of a lever 175 carrying a quadrant rack 176 which drives a miter gear 177 fixed to a gear 178 in mesh with a gear 179 rotating with the spring barrel 84. During the letter-feed rotation of the platen as the line is being written, the gears are rotated in the directions indicated by the arrows on Fig. 13, thereby gradually carrying the lever 175 upward from the full-line position (Fig. 14) to the dotted line position in which the lever rests against a stop 180. When the lever is depressed it operates through the train of gears to rotate the platen backward and bring the work-sheet into position for the commencement of a new line. The downward movement of the lever 175 may be limited by a stop 181 in the path of the quadrant rack. The stops 180 and 181 may be made adjustable to vary the initial and final movement of the platen, as desired.

When the parts are in their normal position of rest, the shift key being released so that the platen is in lower case position, the machine is adapted for writing Korean. The work-sheet is now placed in the machine, and the carriage brought to the left so that the printing point is at the upper right-hand corner of the work-sheet or printing area. In placing the work-sheet, the shift key may be depressed to permit rotation of the platen independently of the motor 84, or the platen may be rotated by actuating the space key 61. Any desired type key is now struck and the corresponding type bar operated to print the character through the ribbon on the work-sheet, the ribbon vibrator being operated by the universal bar. As both the letter-feed mechanisms are held silent or inoperative by the type keys, the platen remains at rest. A second type key may now be operated to print a vowel above or at the side of the first character. The single-space bar 61 is then actuated and operates the escapement dogs 103, 104, to permit a letter-space rotation of the platen, thereby bringing the work-sheet into position to receive the next character immediately below the first.

Any required number of characters may thus be written to complete a word or group, and when the last character of a group has been written, the double-space bar 111 is operated to effect a rotation of the platen through two letter-space distances, so that a letter-space is left between the completed word or group and the succeeding word. After a line of writing has been completed, the lever 175 is depressed to return the work-sheet to initial position; and the back-space lever 137 is operated one or more times to effect the movement of the carriage through any desired distance to the right to space for the next line. The backward rotation of the line-space wheel 102, when the lever 175 is operated, is permitted by the pivoted tooth 103ª on the dog 103.

When it is desired to write English, the shift key 20 is depressed and automatically held in such position by the latch 75. The depression of this key effects the following adjustments in the mechanism, adapting it for writing English:—the platen is lifted to upper case position, so that only the upper case or English characters will strike the platen; the shift key operates through the link 134 to open the clutch 90, so that the platen may be rotated independently of the motor 84; the shaft 108 is moved downward, swinging the escapement dogs forward to lock the escapement wheel 102 and by holding the shaft 108 down, preventing the escapement mechanism from being operated by the space key 61; the escapement mechanism controlling the carriage travel is brought into operative relation to the universal bar frame 30 by means of the rock shaft 46 being released and permitting the interponent slide 39 to move upward to operative position; and the arm 67 is thrown up into operative position ready to operate the escapement when the single-space key 61 is operated. This adjustment of the parts permits the carriage to be fed a letter-space distance to the left each time a type key is actuated, and also permits the single-space bar to operate the escapement mechanism. The machine may thus be used in the usual manner for writing English, the rotary line-space movement of the platen being effected by operating the line-space lever 78.

It will be understood that although the machine has been particularly described as adapted for writing English and Korean, the type bars being shown provided with characters of these languages, the machine may readily be adapted for writing any two languages, in one of which the lines are written from left to right on the page, and in the other of which the lines are written from the top to the bottom of the page.

Variations may be resorted to within the scope of the invention, and portions of the improvements may be used without others.

Having thus described my invention, I claim:

1. In a typewriting machine, the combination of a platen, types movable into printing relation to the platen, a case shift for determining how said types shall print, and letter-feed mechanism to effect relative movements of the platen and types in different directions in a manner determined by said case shift.

2. In a typewriting machine, the combination of a platen, a set of type-bars, means to individually actuate the type-bars to printing position, a case shift for determining how the types shall print and letter-feed mechanism to impart relative movements to the platen and set of type-bars in different directions for writing lines in different directions on a work-sheet in a manner determined by said case shift.

3. In a typewriting machine, the combination of a platen, type-bars, means to actuate the type-bars, a case shift for determining how the types shall print and mechanism to impart letter-feed movements to the platen selectively in different directions in a manner determined by said case shift.

4. In a typewriting machine, the combination of a carriage, type-bars, a case shift for determining how the types shall print, mechanism for imparting a letter-feed movement to the carriage for printing lines in one direction on a work-sheet, additional letter-feed mechanism for writing lines in a different direction on the work-sheet, and means controlled by said case shift for determining which mechanism shall be effective.

5. In a typewriting machine, the combination with printing types and a case shift therefor, of means for selectively moving a work-sheet in directions perpendicular to each other, mechanism for effecting a letter-feed control of said movements whereby the lines of writing may be made either vertical or horizontal on the work-sheet, and means controlled by said case shift for determining whether the lines of writing shall be vertical or horizontal.

6. In a typewriting machine, the combination of a rotary platen, a case shift for moving said platen, letter-feed mechanism for rotating the platen, means to effect a letter-feed movement of the platen in the direction of its axis, and means controlled by said case shift for determining which letter feed shall be effective.

7. In a typewriting machine, the combination of a traveling carriage, a rotatable platen thereon, a case shift for moving said platen, mechanism for imparting a letter-feed movement to the carriage, mechanism for imparting a letter-feed rotation to the platen, and means controlled by said case shift for determining which letter feed shall be effective.

8. In a typewriting machine, the combination of a cylindrical platen, a case shift for moving said platen, letter-feed mechanisms selectively operable to either rotate the platen or feed it in the direction of its axis, and means controlled by said case shift for determining which letter feed shall be effective.

9. In a typewriting machine, the combination of a platen, a case shift for moving said platen, power mechanism for selectively rotating the platen or moving it in the direction of its axis, escapement mechanisms controlling said movements of the platen, and means controlled by said case shift for determining which escapement shall be effective.

10. In a typewriting machine, the combination of a traveling carriage, a platen mounted to rotate thereon, a case shift for moving said platen, a power motor to rotate the platen, escapement mechanism controlling said rotation to effect a letter-feed rotation of the platen, a power motor to drive the carriage, a letter-feed mechanism controlling the movement of the carriage, and means controlled by said case shift for determining which letter feed shall be effective.

11. In a typewriting machine, the combination of a traveling carriage, a platen rotatable thereon, a case shift for moving said platen, a power motor for rotating said platen, escapement mechanism controlling said rotation for effecting a letter-feed rotation of the platen for printing lines vertically on a work-sheet, a power motor to drive the carriage in one direction, line-space mechanism for line-spacing the carriage in the reverse direction, and means controlled by said case shift for determining which motor shall be effective.

12. In a typewriting machine, the combination with a traveling carriage, of a rotatable platen thereon, a motor to drive the carriage, escapement mechanism controlling the movement of the carriage, line-space mechanism for rotating the platen, a motor to rotate the platen, escapement mechanism controlling said rotation, and means to prevent interference between said last-named motor and said line-space mechanism.

13. In a typewriting machine, the combination with a traveling carriage, of a rotatable platen thereon, a motor to drive the carriage, escapement mechanism controlling the movement of the carriage, line-space mechanism for rotating the platen, a motor to rotate the platen, escapement mechanism separate from said line-space mechanism and controlling said rotation, and line-space mechanism for moving the platen and carriage in the direction of the platen axle.

14. In a typewriting machine, the combination with a shiftable platen, of a set of types for writing on the platen when in one position, escapement mechanism coöperating with said types, a second set of types for writing when the platen is given another position, and a second escapement mechanism effective in a different manner and coöperating with said second set of types.

15. In a typewriting machine, the combination of a platen shiftable to upper and lower case positions, type-bars having upper and lower case types, letter-feed mechanism to feed the platen when in upper case position, and separate letter-feed mechanism effective in a different manner to feed the platen when in lower case position.

16. In a typewriting machine, the combination of a rotatable platen shiftable to upper and lower case positions, type-bars having upper and lower case types, means for imparting a letter-feed movement to the platen in the direction of its axis when in one of said positions, and means for imparting a rotary letter-feed movement to the platen when in the other of said positions.

17. In a typewriting machine, the combination with a carriage, of a cylindrical platen mounted thereon, said platen being shiftable to upper and lower case positions, type-bars having upper and lower case types, a motor to drive the carriage, escapement mechanism controlling the movement of the carriage for effecting a letter-feed travel of the platen in the direction of its axis, a motor to rotate the platen, escapement mechanism controlling said rotation to effect a letter-feed rotation of the platen, and means controlled by the shifting of the platen for making said escapements selectively effective.

18. In a typewriting machine, the combination with a carriage, of a cylindrical platen mounted thereon, said platen being shiftable to upper and lower case positions, type-bars having upper and lower case types, a motor to drive the carriage, escapement mechanism controlling the movement of the carriage for effecting a letter-feed travel of the platen in the direction of its axis, a motor to rotate the platen, escapement mechanism controlling said rotation to effect a letter-feed rotation of the platen, a key to shift the platen, and means controlled by said key to selectively set said mechanisms for operation.

19. In a typewriting machine, the combination with a traveling carriage and a cylindrical platen shiftable thereon to upper and lower case positions, of type-bars having upper and lower case types, a motor to drive the carriage, escapement mechanism actuated by the type-bars for controlling the movement of the carriage while the platen is in one of said positions, means to prevent the operation of said escapement mechanism by the type-bars when the platen is shifted to the other position, a motor to rotate the platen when in said last-named position, and escapement mechanism controlling said rotation for effecting a letter-feed movement of the platen.

20. In a typewriting machine, the combination with a traveling carriage and a cylindrical platen shiftable thereon to upper and lower case positions, of type-bars having upper and lower case types, a motor to drive the carriage, escapement mechanism actuated by the type-bars for controlling the movement of the carriage while the platen is in one of said positions, means to prevent the operation of said escapement mechanism by the type-bars when the platen is shifted to the other position, a motor to rotate the platen when in said last-named position, escapement mechanism controlling said rotation for effecting a letter-feed movement of the platen, and a space bar for actuating said last-named escapement mechanism.

21. In a typewriting machine, the combination with a traveling carriage and a cylindrical platen shiftable thereon to upper and lower case positions, of type-bars having upper and lower case types, a motor to drive the carriage, escapement mechanism actuated by the type-bars for controlling the movement of the carriage while the platen is in one of said positions, means to prevent the operation of said escapement mechanism by the type-bars when the platen is shifted to the other position, a motor to rotate the platen when in said last-named position, escapement mechanism controlling said rotation for effecting a letter-feed movement of the platen, a space bar for actuating said last-named escapement mechanism, and means operated by said space bar for operating said first-named escapement mechanism.

22. In a typewriting machine, the combination with a traveling carriage, of a platen thereon shiftable to upper and lower case positions, type-bars having upper and lower case types, type-keys for operating the type-bars, a motor to drive the carriage, escapement mechanism operated from the type-keys to control the letter-feed movement of the carriage when the platen is in lower case position, means to take said escapement mechanism out of the control of the type-keys when the platen is shifted to upper case position, a second motor, a train of gearing between said second motor and the platen for rotating the latter, and escapement mechanism controlling the rotation of the platen when in upper case position.

23. In a typewriting machine, the combination with a traveling carriage, of a platen thereon shiftable to upper and lower case positions, type-bars having upper and lower case types, type-keys for operating the type-bars, a motor to drive the carriage, escapement mechanism operated from the type-keys to control the letter-feed movement of the carriage when the platen is in lower case position, means to take said escapement mechanism out of the control of the type-keys when the platen is shifted to upper case position, a second motor, a train of gearing between said second motor and the platen for rotating the latter, escapement mechanism controlling the rotation of the platen when in upper case position, and means for automatically disconnecting the platen from said second motor when the platen is in lower case position.

24. In a typewriting machine, the combination with a traveling carriage, of a platen thereon shiftable to upper and lower case positions, type-bars having upper and lower case types, type-keys for operating the type-bars, a motor to drive the carriage, escapement mechanism operated from the type-keys to control the letter-feed movement of the carriage when the platen is in lower case position, means to take said escapement mechanism out of the control of the type-keys when the platen is shifted to upper case position, a second motor, a train of gearing between said second motor and the platen for rotating the latter, escapement mechanism controlling the rotation of the platen when in upper case position, a space key to operate said last-named escapement mechanism, a clutch in said train of gearing, case-shifting mechanism, and means operated thereby to open the clutch when the platen is shifted to upper case position.

25. In a typewriting machine, the combination with a traveling carriage, of a platen thereon, a set of keys, two sets of types operable by said keys, a motor to drive the carriage, a second motor, a train of gears between said second motor and the platen for rotating the latter, a clutch in said train, and means for simultaneously determining which types and which motor shall be effective.

26. In a typewriting machine, the combination with a traveling carriage, of a platen thereon, a motor to drive the carriage, a second motor, a train of gears between said second motor and the platen for rotating the latter, a clutch in said train, case-shift mechanism, and means operated thereby to actuate the clutch.

27. In a typewriting machine, the combination with a traveling carriage, of a rotatable platen thereon, case-shift mechanism, a space key, means actuated thereby to effect a letter-space movement of the carriage and platen when the platen is in one case position, and means actuated by the said space key to effect a letter-feed rotation of the platen when in another case position.

28. In a typewriting machine, the combination with a traveling carriage and a platen thereon, of escapement mechanism controlling the travel of the carriage, said platen being shiftable to upper and lower case positions, a space key in operative relation to the said escapement mechanism when the platen is in upper case position, and means to automatically render said space key ineffective with relation to the escapement mechanism when the platen is shifted to lower case position.

29. In a typewriting machine, the combination with a traveling carriage and a platen thereon, of escapement mechanism controlling the letter-feed movement of the carriage, said platen being shiftable to upper and lower case positions, a space key in operative relation to said escapement mechanism when the platen is in upper case position, a motor geared to the platen for rotating the platen, a second escapement mechanism controlling said rotation, and means operated when the platen is shifted from upper to lower case position to operatively connect said space key to said second escapement mechanism and disconnect it from said first-named escapement mechanism.

30. In a typewriting machine, the combination with a traveling carriage, of a platen thereon shiftable to upper and lower case positions, escapement mechanism controlling the travel of the carriage, a shift key, a space key, means operated by the space key to actuate said escapement mechanism, and mechanism operated by the shift key to render said means effective.

31. In a typewriting machine, the combination of a traveling carriage, an escapement mechanism controlling the travel of the carriage, a space key, a rock shaft connected to be rocked by the space key, an arm on said rock shaft in position to operate the escapement mechanism, a shift key, and means operated thereby to move said arm to effective position.

32. In a typewriting machine, the combination with a traveling carriage, of an escapement device controlling the movement of the carriage, a platen on the carriage, a shift key to shift the platen, a space key, a rock shaft actuated thereby, a rock arm having a slidable connection with said shaft, a device operated by the shift key to project said arm into position for operating the escapement device when the shift key is depressed, and means for retracting said arm to inoperative position when the shift key is released.

33. In a typewriting machine, the combination with a rotary platen, of an escapement mechanism to control the rotation of the platen, a space key to operate said escapement mechanism, and a shift key operable when depressed to hold said escapement mechanism out of position to be operated by the space key.

34. In a typewriting machine, the combination with an escapement wheel, of escapement dogs coöperating therewith, a rock arm connected to said dogs, a space key adapted to rock said arm, and a shift key operable when depressed to hold said arm out of position to be actuated by the space key.

35. In a typewriting machine, the combination with a traveling carriage, of a rotary platen thereon shiftable to upper and lower case positions, a shift key operable when depressed to shift the platen to upper case position, a latch to hold said shift key depressed, a motor to drive the carriage, an escapement mechanism controlling the travel of the carriage, type-bars, means actuated thereby to operate said escapement mechanism when the platen is in upper case position, means operated by the shifting of the carriage to lower case position to render said escapement mechanism inoperative by the type-bars, a second motor, a train of gearing from the said second motor to the platen for rotating the latter, said train including a clutch, an escapement mechanism controlling the movement of said second motor, means operated by said shift key for rendering said last-named escapement mechanism inoperative when the shift key is depressed, means operated by the shift key for opening said clutch when the shift key is depressed, a space bar, a device operated thereby for actuating the first-named escapement mechanism when the shift key is depressed, means operable when the shift key is released to disconnect said device from the first-named escapement mechanism, and means operable upon such release to render the second-named escapement operable by said space-bar.

36. In a typewriting machine, the combination with a platen and an escapement therefor, of a case-shift mechanism and means for locking said escapement when said case-shift mechanism is in one of its positions.

37. In a typewriting machine, the combination with a traveling carriage and a shiftable platen thereon, of a case-shift mechanism, an escapement for said platen, and means for locking said escapement when said platen is shifted from its normal position.

38. In a typewriting machine, the combination with a traveling carriage and a letter-space key therefor, of a case-shift mechanism, and means for making said space key ineffective by said case-shift mechanism.

39. In a typewriting machine, the combination with a traveling carriage and a letter-space key therefor, of an escapement for said carriage, a case-shift mechanism operating on said carriage, a shift key, and connections whereby the shift key and the space key are both effective on said escapement.

40. In a typewriting machine, the combination with printing keys and a platen, of letter-feeding means for said platen, a space key effective to cause letter-feeding in two different directions, and a second space key effective to double the feed of said first-named key.

41. In a typewriting machine, the combination with printing keys and a platen, of a space key selectively effective to cause characters to be printed either vertically or horizontally, and a separate space key effective in only one of said directions.

42. In a typewriting machine, the combination with a traveling carriage and a platen thereon, of a lever for moving said carriage and platen endwise to line-space the latter, a second lever adapted to impart a rotary line-spacing movement to said platen, a case-shift mechanism, and means connected to said case-shift mechanism for causing either of said levers to be effective.

43. In a typewriting machine, the combination with types adapted to print to be read vertically, and other types adapted to print on the same sheet in the same direction to be read horizontally, of a key adapted to act as a back-space key for one set of types and as a line-space key for the other set of types.

44. In a typewriting machine, the combination with types adapted to print to be read vertically, and other types adapted to print on the same sheet in the same direction to be read horizontally, of a key adapted to act as a back-space key for one set of types and as a line-space key for the other set of types, a platen for said types, and a separate escapement for each set of types.

45. In a typewriting machine, the combination with a traveling carriage, a set of types, and a set of keys operating said types, of a second set of types operable by said keys, an escapement for said carriage, a platen operatively related to said carriage, an escapement for said platen, and means for simultaneously determining which types and which escapement shall be effective.

46. In a typewriting machine, the combination of a rotatable platen shiftable to upper and lower case positions, type-bars having upper and lower case types, a motor to shift said platen endwise when in one of said positions, escapement mechanism controlling the endwise shifting of said platen for effecting a letter-feed travel thereof, a motor to rotate said platen when the latter is in the other of said positions, and escapement mechanism to control the rotation of said platen for effecting a letter-feed rotation thereof.

47. In a typewriting machine, the combination of a carriage, a platen thereon, a motor for driving the carriage, a motor upon the stationary framing of the machine wholly independent of the first-named motor, a driving train leading from the second-named motor to the carriage and platen for rotating said platen at any position of the carriage, letter-feeding mechanism to coöperate with the first motor to drive the platen endwise, letter-feeding mechanism to coöperate with the second motor to rotate the platen, and means to silence either letter-feeding mechanism.

48. In a typewriting machine, the combination of a carriage, a platen thereon, a motor for driving the carriage, a motor wholly independent of the first-named motor, a driving train leading from the second-named motor to the platen for rotating said platen, a clutch in said train for rendering the same alternatively active or inactive, case-shift mechanism, and means connected to said mechanism for opening said clutch when said platen is shifted to upper case position.

49. In a typewriting machine, the combination with a rotatable platen and a motor for driving it, said platen being shiftable to upper and lower case positions, of an escapement mechanism for controlling the rotation of said platen by said motor, a space-key operatively connected to said escapement mechanism when the platen is in lower case position, and means operated when the platen is shifted to upper case position to disconnect said key from said escapement mechanism.

50. In a typewriting machine, the combination with a rotatable platen and a motor for driving it, said platen being shiftable to upper and lower case positions, of an escapement mechanism for controlling the rotation of said platen by said motor, a space-key operatively connected with said escapement mechanism when the platen is in one of said positions, and means operated when the platen is shifted to the other of said positions to disconnect said key from said escapement mechanism.

51. In a typewriting machine, the combination with a traveling carriage and a platen thereon, of escapement mechanism controlling the travel of the carriage, said platen being shiftable to upper and lower case positions, a space-key in operative relation to said escapement mechanism when the platen is in one of said positions, and means to automatically render said key ineffective with relation to said escapement mechanism when said platen is shifted to the other of such positions.

52. In a typewriting machine, the combination with a rotatable platen shiftable to upper and lower case positions, of a motor, a driving train leading from said motor to said platen to rotate the latter, a clutch in said train for rendering the same alternatively active or inactive, and means for automatically closing said clutch when said platen is shifted to one of said positions.

53. In a typewriting machine, the combination with a rotatable platen shiftable to upper and lower case positions, of a motor, a driving train leading from said motor to said platen to rotate the latter, a clutch in said train for rendering the same alternatively active or inactive, an escapement mechanism controlling the rotation of said platen, a space-key connected to operate said escapement mechanism, and means to automatically open said clutch when said platen is shifted to one of said positions, and to automatically close said clutch when said platen is shifted to the other position.

54. In a typewriting machine, the combination with a rotatable platen shiftable to upper and lower case positions, of a motor, a driving train leading from said motor to said platen to rotate the latter, a clutch in said train for rendering the same alternatively active or inactive, an escapement mechanism controlling the rotation of said platen, a space-key connected to operate said escapement mechanism, and means to automatically open said clutch when said platen is shifted to upper case position, and to automatically close said clutch when said platen is shifted to lower case position.

55. In a typewriting machine, the combination with a carriage and a platen thereon, of an escapement mechanism controlling the movement of the carriage, a member for actuating said escapement mechanism, a space-key for operating said member, a shift-key, and means actuated by the shift-key for rendering said member effective with relation to said escapement mechanism.

56. In a typewriting machine, the combination with a carriage and a platen thereon, of an escapement mechanism controlling the movement of the carriage, a member for actuating said escapement mechanism, a space-key, connections between said member and said space-key for operating the former when the latter is depressed, a shift-key, connections between said member and said shift-key for moving said member into effective position with relation to said escapement mechanism when said shift-key is depressed, and means for automatically moving said member out of such position when said shift-key is released.

57. In a typewriting machine, the combination with a platen, of separate mechanisms for imparting step-by-step, rotary and endwise letter-spacing movements to said platen, a space-key adapted to control either of said mechanisms, and a platen shift-key for determining the mechanism to be so controlled.

58. In a typewriting machine, the combination with a platen, of separate mechanisms for imparting step-by-step, rotary and endwise letter-spacing movements to said platen, each of said mechanisms including an escapement, and a platen shift-key for rendering said space-key simultaneously effective with relation to either escapement and ineffective with relation to the other escapement.

59. In a typewriting machine, the combination with a platen and a case-shift mechanism therefor, of a set of types effective in one position of the platen for writing a language in which the lines of writing extend vertically, side by side, down the page, a set of types effective in the other position of said platen for writing a language in which the lines extend horizontally, one below another, across the page, keys for operating said types, an escapement for the platen, and means for locking said escapement when writing one language and not the other.

60. In a typewriting machine, the combination with a platen and a case-shift mechanism therefor, of a set of types effective in one position of the platen for writing a language in which the lines of writing extend vertically, side by side, down the page, a set of types effective in the other position of said platen for writing a language in which the lines extend horizontally, one below another, across the page, keys for operating said types, an escapement for effecting a rotary, step-by-step, letter-feeding movement of the platen when writing with the first-named set of types, an escapement for causing an endwise, step-by-step, letter-feeding movement of the platen when writing with the second-named set of types, and means for locking the first-named escapement when the second-named escapement is in action.

61. In a typewriting machine, the combination with a platen and a case-shift mechanism therefor, of a set of types effective in one position of the platen for writing a language in which the lines of writing extend vertically, side by side, down the page, a set of types effective in the other position of said platen for writing a language in which the lines extend horizontally, one below another, across the page, keys for operating said types, means for imparting a rotary, step-by-step, letter-feeding movement to said platen when writing with the first-named set of types, means for imparting an endwise, step-by-step, letter-feeding movement to said platen when writing with the second-named set of types, a lever for shifting said platen endwise to line-space it when writing with said first-named set of types, and a lever for rotating said platen to line-space it when writing with said second-named set of types.

62. In a typewriting machine, the combination with a platen and a case-shift mechanism therefor, of a set of types effective in one position of the platen for writing a language in which the lines of writing extend vertically, side by side, down the page, a set of types effective in the other position of said platen for writing a language in which the lines of writing extend horizontally, one below another, across the page, means for imparting a rotary, step-by-step, letter-feeding movement to said platen when writing with the first-named set of types, means for imparting an endwise, step-by-step, letter-feeding movement in one direction to said platen when writing with the second-named set of types, a lever for rotating said platen backwardly to position the work-sheet to begin a new line of writing when writing with said first-named set of types, and a lever for shifting said platen endwise in the opposite direction to position the work-sheet to begin a new line of writing when writing with said second-named set of types.

63. In a typewriting machine constructed and having types for writing both a language in which the lines of writing extend vertically, side by side, down the page, and a language in which the lines of writing extend horizontally across the page, the combination of a horizontally-arranged platen, two sets of types constructed to make normally-upright imprints upon a work-sheet, keys for operating said types, a motor for rotating said platen, an escapement for controlling the rotation of said platen by said motor, to impart a rotary, step-by-step, letter-feeding movement to the platen, a clutch between said motor and said platen, means for opening said clutch, and means connected with the types for effecting letter-feeding movements of the platen endwise.

64. In a typewriting machine, the combination with a revoluble platen, of a set of types constructed to write a language in which the written lines extend vertically, side by side, down the page, a second set of types constructed to write a language in which the written lines extend horizontally, one below another, across the page, a single set of keys for operating said types, mechanism for effecting a caseshift from a position in which one set of types is effective to a position in which the other set of types is effective, a letter-feeding mechanism for controlling the rotation of said platen, and a letter-feeding mechanism for controlling the endwise movements of said platen.

65. In a typewriting machine, the combination with a movable paper-holder, of an escapement, therefor, including a rocker, printing means, a key, a rock shaft operated thereby and having a depending double cam-faced arm engageable with said rocker during both the forward and the return movements of the shaft to impart a double movement to the rocker, to effect two operations of said escapement at one complete operation of said key, an arm connected to said shaft, and a link connecting the second-named arm and the key.

66. In a typewriting machine, the combination with a platen and a motor connected to drive the same, of an escapement for controlling the rotation of said platen by said motor to effect a step-by-step, letter-spacing movement of said platen, said escapement including a rocker, printing means, an arm engageable with said rocker during both the forward and return movements of said arm, to impart a double movement to said rocker, and a key connected with said arm to operate the same, to effect two operations of said escapement at one complete operation of said key.

J FRANK ALLARD.

Witnesses:
F. E. ALEXANDER,
JULIUS DUCKSTINE.